(12) United States Patent
Pistor et al.

(10) Patent No.: US 11,383,318 B2
(45) Date of Patent: Jul. 12, 2022

(54) FILLER WIRE POSITION CONTROL

(71) Applicant: LIBURDI ENGINEERING LIMITED, Dundas (CA)

(72) Inventors: Robert Joseph Pistor, Burlington (CA); Matthew Ronald Reid, Dundas (CA)

(73) Assignee: Liburdi Engineering Limited, Dundas (CA)

( * ) Notice: Subject to any disclaimer, the term of this patent is extended or adjusted under 35 U.S.C. 154(b) by 600 days.

(21) Appl. No.: 16/248,698

(22) Filed: Jan. 15, 2019

(65) Prior Publication Data
US 2019/0240765 A1 Aug. 8, 2019

Related U.S. Application Data

(60) Provisional application No. 62/625,909, filed on Feb. 2, 2018.

(51) Int. Cl.
*B23K 9/133* (2006.01)
(52) U.S. Cl.
CPC .................. *B23K 9/1336* (2013.01)
(58) Field of Classification Search
CPC ...... B23K 9/1336; B23K 26/34; B23K 9/124; B23K 9/04; B23K 5/22; B23K 7/10; B23K 9/1093; B23K 9/0026; B23K 9/173
USPC ........ 219/75, 124.02, 130.32, 130.21, 137.7, 219/138, 146.1
See application file for complete search history.

(56) References Cited

U.S. PATENT DOCUMENTS

| | | | |
|---|---|---|---|
| 4,298,784 A | 11/1981 | Schmall | |
| 4,636,610 A | 1/1987 | Kamo et al. | |
| 4,795,882 A | 1/1989 | Hardwick et al. | |
| 5,187,348 A | 2/1993 | Cuba et al. | |
| 6,028,287 A | 2/2000 | Passage et al. | |
| 6,452,131 B2 | 9/2002 | Britnell | |
| 7,087,856 B2 | 8/2006 | Eldridge | |
| 7,408,130 B2 | 8/2008 | Sonoda et al. | |
| 7,557,589 B2 | 7/2009 | Iwata et al. | |
| 9,555,498 B2 | 1/2017 | Hirsch | |
| 9,782,850 B2 | 10/2017 | Peters et al. | |
| 2013/0180971 A1 | 7/2013 | Peters et al. | |
| 2013/0327749 A1 | 12/2013 | Denney et al. | |
| 2014/0008343 A1 | 1/2014 | Ash | |
| 2014/0312020 A1 | 10/2014 | Daniel | |
| 2015/0183045 A1 | 7/2015 | Peters et al. | |
| 2017/0334011 A1* | 11/2017 | Peters | B23K 9/092 |

OTHER PUBLICATIONS

Canadian Office Action, for Patent Application No. 3,032,171, dated Dec. 23, 2019, 5 pages.

* cited by examiner

*Primary Examiner* — Phuong T Nguyen
(74) *Attorney, Agent, or Firm* — Lewis Roca Rothgerber Chritie LLP

(57) ABSTRACT

A system and method for controlling the position of a filler wire and/or a laser head, or other heating head, in a welding system. The distal end of the filler wire is gradually moved, e.g., upward, until electrical continuity with the weld pool is lost; the filler wire is then moved back into contact with the weld pool. The heating head may be stationary relative to the weld pool, or it may move, with the distal end of the filler wire, relative to the weld pool.

17 Claims, 3 Drawing Sheets

FILLER WIRE POSITION CONTROL

CROSS-REFERENCE TO RELATED APPLICATION(S)

The present application claims priority to and the benefit of U.S. Provisional Application No. 62/625,909, filed Feb. 2, 2018, entitled "CONTROL FOR ADDITIVE WELDING", the entire content of which is incorporated herein by reference.

FIELD

One or more aspects of embodiments according to the present invention relate to welding, and more particularly to a system and method for controlling the position of a filler wire and/or the position of a heating head in a welder.

BACKGROUND

Laser additive welding uses a laser beam to melt a consumable filler material to additively increase the volume of the substrate. When the consumable is in wire form, continuous operator monitoring and adjustment may be used to ensure correct laser beam focal point, filler wire entry point and that the substrate is aligned in a thermally optimum fashion to ensure weld quality. This continuous monitoring may require human operator feedback for the duration of the weld or the use of a sophisticated machine-vision-based control system, both of which may significantly increase the cost of performing the weld. Similar issues exist when other heat sources are used, i.e., the heating head is not a laser head but, e.g., a plasma welding head.

Thus, there is a need for an improved system and method for controlling the position of a filler wire and/or the position of a heating head in a welder.

SUMMARY

According to an embodiment of the present disclosure there is provided a method for adjusting the position of a filler wire relative to a weld pool during welding, the method including: determining whether an electrical continuity criterion, for electrical continuity between the filler wire and the weld pool, is met; moving a distal end of the filler wire in a first direction relative to the weld pool, while the electrical continuity criterion is met, the first direction being selected to cause the electrical continuity criterion to cease to be met; and when the electrical continuity criterion ceases to be met, moving the distal end of the filler wire in a second direction relative to the weld pool, the second direction being selected to cause the electrical continuity criterion to be met.

In one embodiment, the method includes: moving a substrate, including the weld pool, in a third direction relative to a heating head; supplying heat from the heating head to the substrate and to the weld pool, wherein the first direction is: within 30 degrees of a line between the weld pool and the heating head; and at least 30 degrees from the third direction.

In one embodiment, the heating head is vertically above the weld pool, the first direction is vertically up, the second direction is vertically down, and the third direction is horizontal.

In one embodiment, the moving of the distal end of the filler wire in the first direction relative to the weld pool includes moving the distal end of the filler wire relative to a weld pool at a speed that is: greater than one hundredth of the speed of the moving of the substrate in the third direction relative to the heating head, and less than one half of the speed of the moving of the substrate in the third direction relative to the heating head.

In one embodiment, the moving of the distal end of the filler wire in the second direction relative to the weld pool includes moving the distal end of the filler wire through a fixed distance relative to the weld pool.

In one embodiment, the filler wire is a round wire having a diameter, and wherein the fixed distance is greater than 0.5 times the diameter and less than 1.5 times the diameter.

In one embodiment, the moving of the distal end of the filler wire through the fixed distance relative to the weld pool includes moving the distal end of the filler wire through the fixed distance during a time interval shorter than 0.5 seconds.

In one embodiment, the electrical continuity criterion is met when the resistance between the filler wire and the weld pool is less than a threshold.

In one embodiment, the threshold is greater than 100 ohms.

In one embodiment, the determining of whether the electrical continuity criterion is met includes: connecting a direct current source across the filler wire and the weld pool, and determining the voltage drop across the filler wire and the weld pool.

In one embodiment, the direct current source includes a voltage source connected in series with a resistor, and wherein the determining of the voltage drop across the filler wire and the weld pool includes measuring the voltage drop across the resistor, and subtracting the measured voltage drop from a nominal output voltage of the voltage source.

In one embodiment, the weld pool is in a substrate; the method further includes supplying heat from a heating head to the substrate and to the weld pool, and the moving of the distal end of the filler wire in the first direction relative to the weld pool includes: moving the heating head in the first direction relative to the weld pool; and maintaining the position of the heating head relative to the distal end of the filler wire constant.

In one embodiment, the heating head is a laser head.

In one embodiment, the method includes maintaining the position of the distal end of the filler wire relative to the weld pool constant, before the moving of the distal end of the filler wire in the first direction relative to the weld pool, and before the moving of the distal end of the filler wire in the second direction relative to the weld pool.

According to an embodiment of the present disclosure there is provided a system for welding, the system including: a heating head for heating a substrate; a conductive substrate attachment for forming a conductive connection to the substrate; a filler wire; a circuit for determining whether an electrical continuity criterion, for electrical continuity between the filler wire and the substrate, is met; and a filler wire relative position control system, the filler wire relative position control system being configured, in operation, to move a distal end of the filler wire in a first direction relative to a weld pool on the substrate, while the electrical continuity criterion is met, the first direction being selected to cause the electrical continuity criterion to cease to be met; and when the electrical continuity criterion ceases to be met, to move the distal end of the filler wire in a second direction relative to the weld pool, the second direction being selected to cause the electrical continuity criterion to be met.

In one embodiment, the position control system is further configured to move the substrate in a third direction relative to the heating head; and the moving of the distal end of the filler wire in the first direction relative to the weld pool includes moving the distal end of the filler wire relative to a weld pool at a speed that is: greater than one hundredth of the speed of the moving of the substrate in the third direction relative to the heating head, and less than one tenth of the speed of the moving of the substrate in the third direction relative to the heating head.

In one embodiment, the moving of the distal end of the filler wire in the second direction relative to the weld pool includes moving the distal end of the filler wire through a fixed distance relative to the weld pool.

In one embodiment, the system includes a conductive sleeve surrounding the filler wire and connected to the circuit for determining whether the electrical continuity criterion is met.

BRIEF DESCRIPTION OF THE DRAWINGS

These and other features and advantages of the present invention will be appreciated and understood with reference to the specification, claims, and appended drawings wherein:

DETAILED DESCRIPTION

Figure 1:
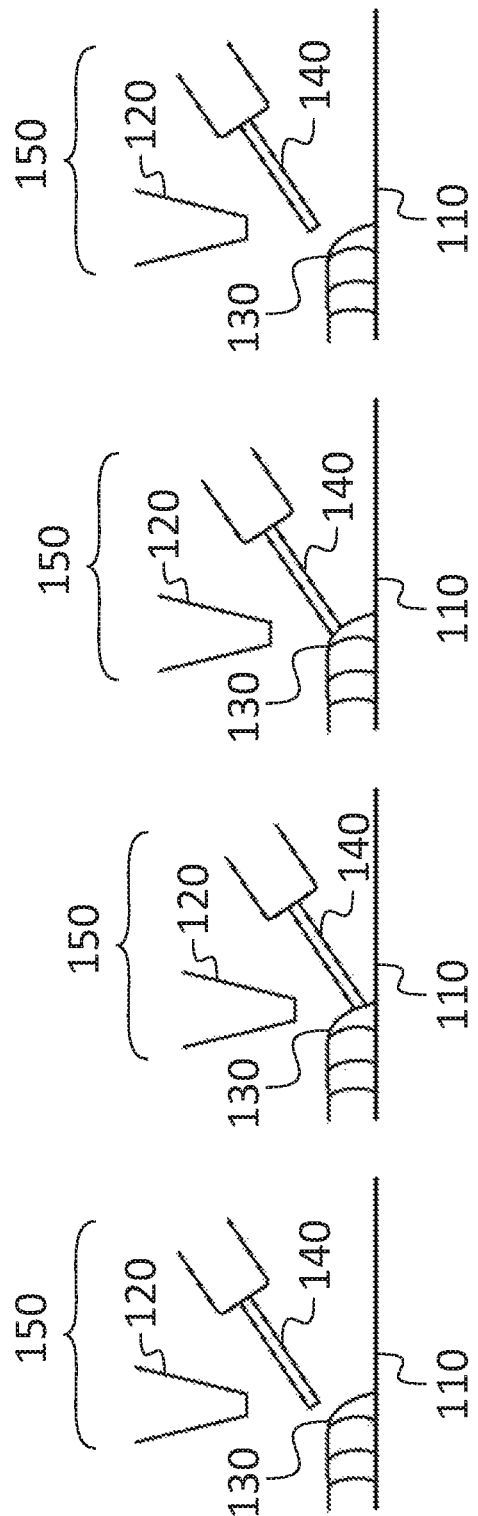
FIG. 1A is a schematic drawing of a weld in progress, according to an embodiment of the present invention.
FIG. 1B is a schematic drawing of a weld in progress, according to an embodiment of the present invention.
FIG. 1C is a schematic drawing of a weld in progress, according to an embodiment of the present invention.
FIG. 1D is a schematic drawing of a weld in progress, according to an embodiment of the present invention.

The detailed description set forth below in connection with the appended drawings is intended as a description of exemplary embodiments of a system and method for filler wire position control provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features.

Referring to FIGS. 1A-1D, in some embodiments, as a weld progresses across a substrate 110, a laser head 120 focuses light into a small focal volume near the laser head 120 and forms a weld pool 130, and filler metal is added by feeding a filler wire 140 into the weld pool 130 as the weld progresses. The height of the weld head 150 (which includes the laser head 120 and a filler wire feed unit that feeds the filler wire 140) may at a first point in time (illustrated in FIG. 1A) be sufficiently high above the substrate 110 that the filler wire 140 is not in contact with the weld pool 130. This condition may be detected by testing for electrical continuity between the filler wire 140 and the substrate 110. When a loss of electrical continuity between the filler wire 140 and the substrate 110 is detected, the weld head 150 may be lowered by an amount sufficient to reestablish electrical continuity between the filler wire 140 and the substrate 110, so that at a second point in time (illustrated in FIG. 1B) the filler wire 140 is in physical and electrical contact with the weld pool 130. The weld head 150 may then be gradually raised, so that at a third point in time (illustrated in FIG. 1C) the filler wire 140 is higher, but remains in physical and electrical contact with the weld pool 130, until, at fourth point in time (illustrated in FIG. 1D) the filler wire 140 is again not in contact with the weld pool 130, and electrical continuity between the filler wire 140 and the substrate 110 has been lost. The process may then be repeated, with the weld head 150 being lowered whenever electrical continuity is lost, and the weld head 150 being gradually raised when electrical continuity is present between the filler wire 140 and the substrate 110.

Figure 2:
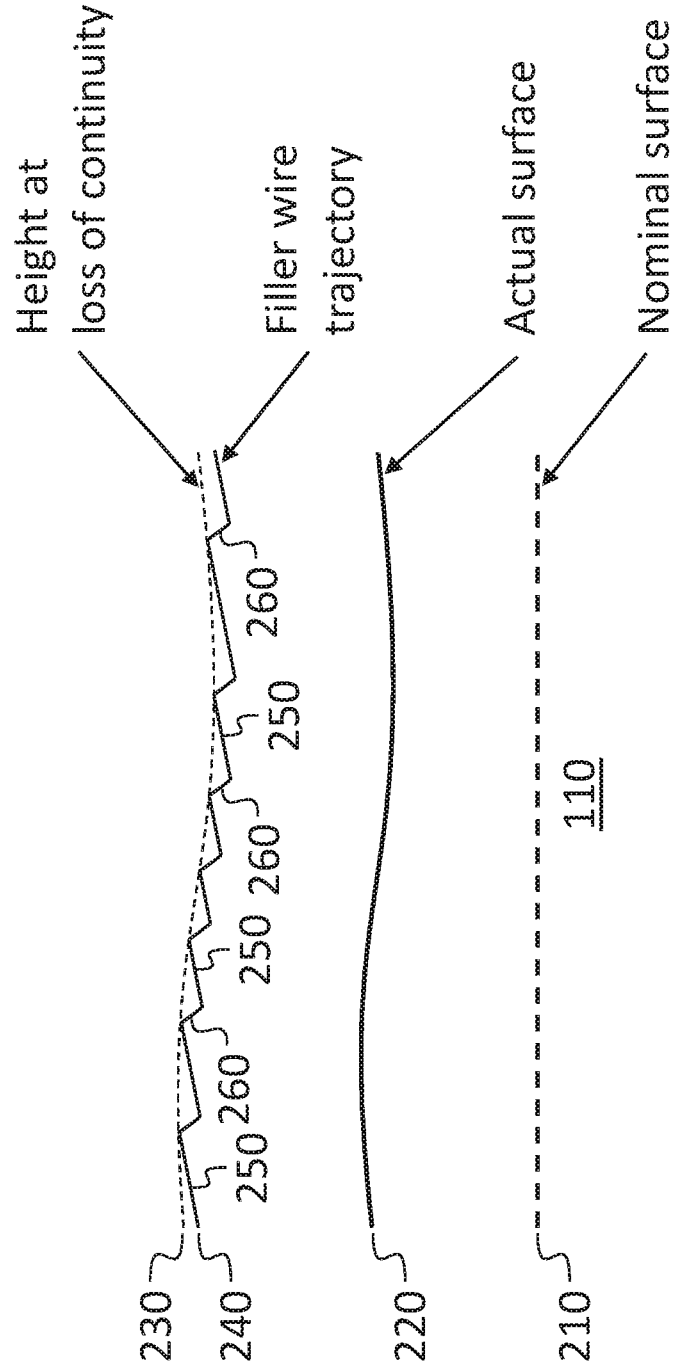
FIG. 2 is an illustration of a filler wire trajectory, according to an embodiment of the present invention.

FIG. 2 shows the trajectory of the tip, or "distal end" of the filler wire 140, in one embodiment, as a weld progresses from left to right over the substrate. The substrate may have a nominal surface 210 (which may, for example, be flat, as shown), and the actual surface 220 may differ from the nominal surface, for example, as a result of imperfections in the process used to fabricate the substrate. For example, if the substrate is formed by depositing material, on a piece of metal initially fabricated to high precision, using a plurality of welding passes, each pass after the first being used to deposit additional material on top of the material deposited during the preceding pass, variations in the thickness of the weld beads may accumulate, resulting in height variations in the top surface 220 of the substrate. As the weld progresses, the weld pool 130 may extend to some height above the actual surface so that height 230 of the distal end of the filler wire 140 at which electrical continuity would be lost may be at some height above the actual surface 220 of the substrate, as shown. The radius of the filler wire 140 may also contribute to the height 230 at which continuity is lost, if for example the height of the distal end of the filler wire 140 is defined to be the height of the center of the distal end of the filler wire 140.

As shown in FIG. 2, if the filler wire 140 is gradually raised whenever electrical continuity is present between the filler wire 140 and the substrate 110, and lowered (e.g., lowered relatively quickly) whenever electrical continuity is lost between the filler wire 140 and the substrate 110, the distal end of the filler wire 140 may follow a trajectory 240 as shown, consisting of a plurality of gradually upward sloping (or "rate climb") first segments 250 (each of which ends when the distal end of the filler wire 140 reaches the height 230 at which electrical continuity is lost) and a plurality of more steeply downward sloping second segments 260. During at least part of each first segment 250, the direction of motion of the filler wire 140 relative to the weld pool 130 is such that the distance between the center of the distal end of the filler wire 140 and the centroid of the weld pool 130 is increasing, and during at least part of each second segment 260, the direction of motion of the filler wire 140 relative to the weld pool 130 is such that the distance between the center of the distal end of the filler wire 140 and the centroid of the weld pool 130 is decreasing, During each of the upward sloping first segments 250 the distal end of the filler wire may be raised gradually (e.g., by raising the filler wire (or the filler wire feed unit) alone, or by raising the weld head, including the laser head and the filler wire), e.g., at a rate of about ¼ inch of height change per foot of (horizontal) travel of the substrate. During this time the electrical continuity between the substrate 110 and filler wire may be continuously monitored until continuity is lost (when the distal end of the filler wire reaches the height 230 at which electrical continuity is lost). When continuity is lost the distal end of the filler wire may be lowered relatively quickly, in a downward sloping second segment 260 (e.g., by lowering the filler wire (or the filler wire feed unit) alone, or by lowering the weld head, including the laser head and the filler wire). During each of the downward sloping second segments 260 the distal end of the filler wire may be lowered by a fixed amount (e.g., by 80% of the diameter of the filler wire, or, for example, by 0.008 inches for filler wire with a diameter of 0.010 inches), and it may be lowered relatively quickly (e.g., within 100 ms of the loss of continuity). The slope of the upward sloping first segments 250 of FIG. 2 has been drawn to be considerably steeper than ¼ inch of height change per foot of travel of the substrate, to make the slope more readily perceptible in the drawing.

The rate at which the filler wire is raised during the upward sloping first segments 250 may be adjusted to suit the task at hand. A higher rate may be better able to adjust to height variations in the substrate, whereas a lower rate may result in smoother deposition when the height of the substrate is highly uniform. Similarly, the rate at which the filler wire is lowered during the downward sloping second segments 260 may be adjusted to suit the task at hand. In some embodiments the rate at which the filler wire is lowered during the downward sloping second segments 260 is adjusted to be as high as feasible within the limitations of the actuators (described in further detail below) used to produce the downward motion, to limit the time during which the filler wire is not in contact with the weld pool, and thereby to avoid irregularities in the weld that may result if this time is excessive (and, for example, significant cooling of the distal end of the filler wire occurs before contact with the weld pool is reestablished). In some embodiments, if the actuators controlling the position of the filler wire 140 are capable of more rapid response (e.g., greater speed or acceleration) than the actuators controlling the laser head 120, it may be advantageous to move the filler wire 140 as quickly as possible, so that the time during which thermal contact between the weld pool and the filler wire 140 is lost is as short as possible, even if doing so means that the motion of the laser head 120 lags behind that of the filler wire 140 during the downward sloping second segments 260.

As discussed above, in some applications, height control according to embodiments of the present invention may be helpful for automatically allowing the filler wire 140 and/or the laser head 120 to follow height variations of the substrate (including any previously deposited layers of weld bead). In some such circumstances, variations in height may be the only variations for which real-time (automatic or manual) control is needed (e.g., the weld path may be substantially straight, and no real-time control may be needed to adjust the position of the filler wire 140 and/or the laser head 120 in the cross-weld direction), and in such a situation embodiments of the present invention may make it possible to avoid the use of a more costly (e.g., machine-vision-based) control system entirely. In addition to maintaining suitable filler wire height, embodiments of the present invention in which the weld head 150 is controlled as a unit (i.e., in which the laser head 120 and the filler wire 140 are moved together) may be helpful for maintaining the height of the focus of the laser beam relative to the weld pool.

When the nominal surface profile is not horizontal but sloped, the rate at which the filler wire is raised during the upward sloping first segments 250 may be adjusted accordingly. For example, the rate may be made higher over portions of the substrate where the nominal surface slopes upward, so that, for example, the rate at which the filler wire moves away from the weld pool is the same as it is when welding on a horizontal portion of the substrate. Similarly, the rate at which the filler wire is raised during the upward sloping first segments 250 may be reduced over portions of the substrate where the nominal surface slopes downward. If the nominal surface of the substrate has a sufficiently steep downward slope, the first segments may be horizontal or downward sloping, with a downward slope that is less (e.g., less by ¼ inch per foot of weld) than the slope of the nominal surface of the substrate. In some embodiments, if the substrate is formed as described above, by depositing material on a piece of metal, using a plurality of welding passes, each pass after the first being used to deposit additional material on top of the material deposited during the preceding pass, then a record may be kept of the trajectory of the distal end of the filler wire during each pass, and this trajectory (or a modified version of the trajectory, e.g., a version that has been smoothed and to which an offset, reflecting a typical height difference between the height of the distal end of the filler wire during a pass and the height of the weld bead formed by the pass, has been added) may be used as the nominal surface profile during the next pass.

Figure 3:
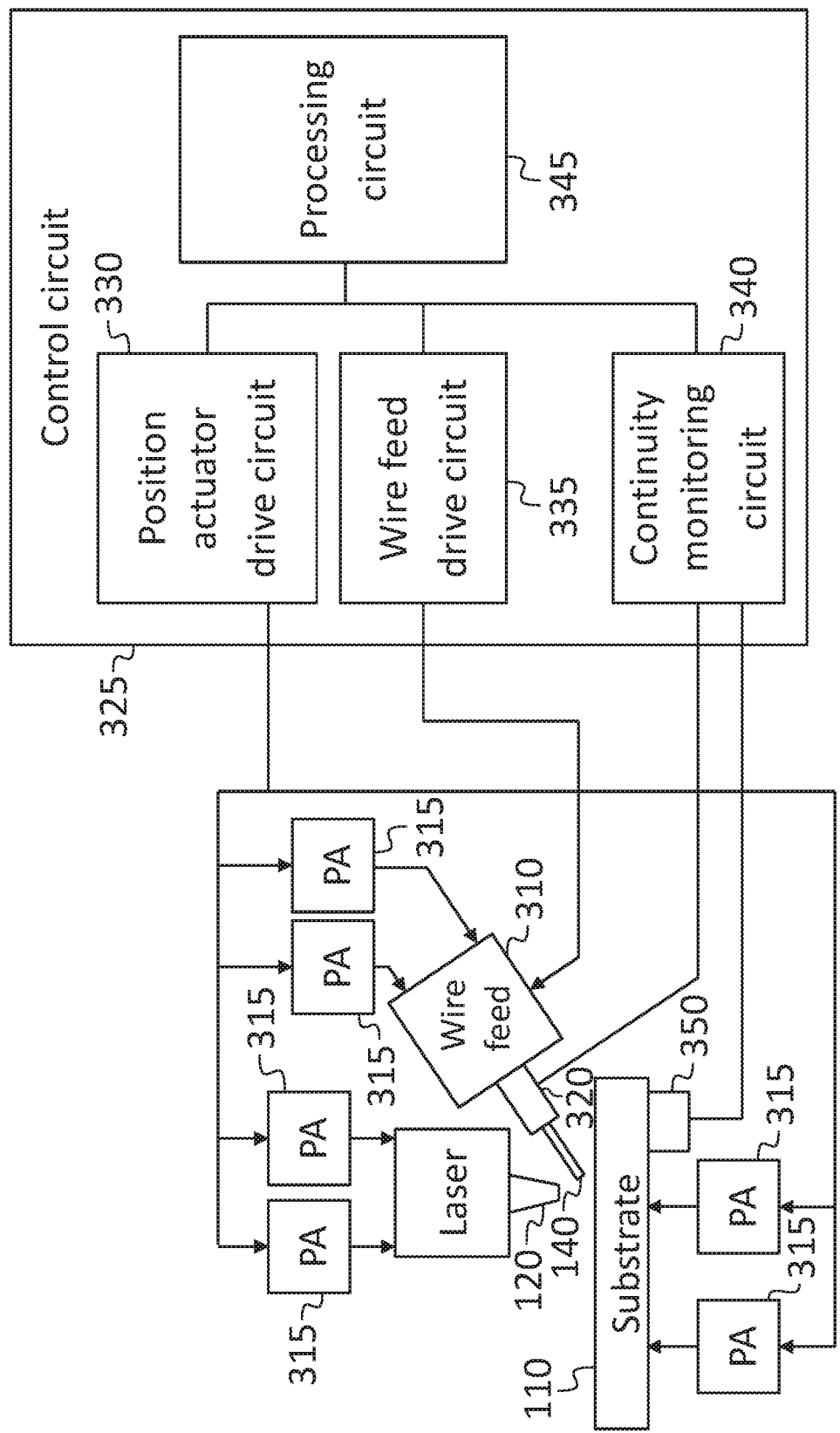
FIG. 3 is a block diagram of a welding system, according to an embodiment of the present invention.

Referring to FIG. 3, in some embodiments a welding system includes, as mentioned above, the laser head 120, and a filler wire feed unit 310 for supplying the filler wire 140 to the weld pool 130. The system further may include a plurality of position actuators 315 (labeled "PA") for controlling the position of the substrate 110, the laser head 120, and the distal end of the filler wire 140. The welding system may also include a control circuit 325, including (i) a position actuator drive circuit 330, for interfacing to the position actuators 315, (ii) a wire feed drive circuit 335, for controlling the feed speed of the filler wire 140, (iii) a continuity monitoring circuit 340 for determining whether electrical continuity is present between the filler wire 140 and the weld pool 130, and (iv) a processing circuit 345 (described in further detail below) for performing high-level control functions such as commanding the position actuators 315 connected to the filler wire feed unit 310 to move up or down depending on whether, as determined by the continuity monitoring circuit 340, electrical continuity is present between the filler wire 140 and the weld pool 130. The system may also include other elements (not shown) such as a laser power supply and controller, and a user interface device.

Two position actuators 315 are shown in FIG. 3 controlling the position of the substrate 110, but more or fewer may be used. For example, three position actuators 315 may be used, to control position along three orthogonal directions (e.g., "translational degrees of freedom", that may be referred to as X, Y, and Z) or six position actuators 315 may be used to control three rotational degrees of freedom in addition to the three translational degrees of freedom, or more than six position actuators 315 may be used, providing a redundant capability to control one or more degrees of freedom. Similarly the position of the laser head 120 may be controlled by two position actuators 315, or by more or fewer position actuators 315. As used herein, the "laser head" is one or more optical elements that determine the position of focal volume within which the laser light is capable of producing significant heating. Moving optical elements so that the focal volume moves (relative to the substrate 110 and/or the filler wire 140) is referred to herein for brevity as "moving the laser head", although in some embodiments the moving of the focal volume may be accomplished by moving one or more mirrors and/or lenses within the laser. Two position actuators 315, or more or fewer position actuators 315, may be mechanically connected to the filler wire feed unit 310 and used to control the position of the distal end of the filler wire 140. In some embodiments the position of the entire filler wire feed unit 310 is controlled by position actuators 315 connected to it. In other embodiments the position actuators 315 are connected instead to a smaller, movable element, such as a sleeve (e.g., a conductive sleeve 320, discussed in further detail below) through which the filler wire 140 passes, and which may be used to control the position of the distal end of the filler wire 140 without moving the entire filler wire feed unit 310.

It will be understood that motion of the system as a whole generally will have little or no effect on the welding operation, and that it is the relative positions and velocities of elements of the system, such as the substrate 110, the weld pool 130, the distal end of the filler wire 140, and the laser head 120 that affect the weld. As such, "moving" a first element relative to a second element may be accomplished either by changing the position of the first element (e.g., with position or speed actuators connected to the first element) or by changing the position of the second element, or by changing the position of one of the first element and the second element by a first amount, and changing the position of the other of the first element and the second element by a second amount, different from the first amount. Accordingly, in some embodiments one or more elements of the substrate 110, the laser head 120 and the filler wire 140 have no position actuators 315 and relative motion is accomplished by moving other elements. For example, instead of moving the filler wire 140 and laser head along the filler wire trajectory 240 (FIG. 2), the substrate 110 may be moved horizontally (e.g., at constant speed) to produce the horizontal component of the relative motion along the trajectory 240 and the filler wire 140 (or the filler wire 140 and the laser head 120) may be moved vertically (e.g., gradually up during the first segments 250 of the trajectory and down, more rapidly, during the second segments 260 of the trajectory) to produce the vertical component of the relative motion along the trajectory 240. In other embodiments the substrate 110 is stationary and the filler wire 140 and the laser head 120 move across the substrate 110, with a height profile according to the trajectory 240, or the wire 140 and the laser head 120 are stationary and the substrate 110 moves horizontally and vertically so that the relative position of the substrate 110 and the filler wire 140 follows the trajectory 240. In some embodiments the feed speed of the filler wire feed unit 310 may be controlled (through the wire feed drive circuit 335) as an additional method for moving the distal end of the filler wire 140 relative to the substrate 110, in a direction that is parallel to the filler wire 140 at the distal end of the filler wire 140.

In some embodiments the filler wire 140 or the laser head 120 may also be caused to move laterally (e.g., in a horizontal direction perpendicular to the direction of the weld), to achieve automated alignment of these elements to the desired weld path. On a planar horizontal substrate such lateral motion may not be effective to cause relative motion, and eventual loss of electrical continuity, between the filler wire 140 and the weld pool, because the weld pool may simply follow the filler wire 140. If, however, the filler wire is moved relative to the laser head 120, electrical continuity may eventually be lost, and a method similar to that described above, resulting in a filler wire trajectory that is horizontal but otherwise analogous to that of FIG. 2 may result. In another embodiment, if a weld is to be formed on top of a sufficiently steep and narrow ridge, lateral motion of the weld pool may be constrained by the sloping portions of the ridge, and for this reason the weld pool may not follow the filler wire 140 even if the laser head 120 is moved laterally with the filler wire 140. Such lateral control (performed by introducing lateral position changes until continuity is lost) may be used alternately with the vertical control described above, with, for example, each pair of vertical segments (a first segment 250 and a second segment 260) being followed by an analogous pair of lateral segments.

Contact between the continuity monitoring circuit 340 and filler wire 140 may be established in any of several ways, including (as shown) through the conductive sleeve 320 through which the filler wire may pass (and be in contact with) or through conductive (metal) rollers between which the filler wire may pass. Contact between the continuity monitoring circuit 340 and the substrate 110 may be established by a conductive substrate attachment 350, which may be a clamp, for clamping a wire to the substrate 110, or a collection of elements providing a conductive path between the continuity monitoring circuit 340 and the substrate 110, such as a metal motion-control table to which the substrate 110 is secured, metal clamps securing the substrate 110 to the motion-control table, and one or more wires connecting the continuity monitoring circuit 340 to the motion-control table and bridging any nonconductive elements in the mechanical load path supporting the substrate 110.

The continuity monitoring circuit 340 may be any device suitable for applying a voltage and/or a current to the substrate 110 and filler wire 140 and for monitoring the resulting current flowing through the filler wire 140 or the voltage across the substrate 110 and filler wire 140. In some embodiments, a reference voltage of 24 V is applied, through a series resistor, across the substrate 110 and filler wire 140, and the voltage across the resistor and/or across the substrate 110 and filler wire 140 is measured, e.g., with an analog to digital converter. When the voltage drop is primarily across the resistor (i.e., the voltage drop across the resistor is substantially equal to 24 V), the system may infer that there is continuity between the substrate 110 and filler wire 140, and when the voltage drop is primarily across the substrate 110 and filler wire 140 (i.e., the voltage drop across the resistor is substantially equal to 0 V) the system may infer that there is no continuity between the substrate 110 and filler wire 140.

In some embodiments, the continuity monitoring circuit 340 includes a premonition circuit that is used to detect an imminent loss of electrical continuity, either by detecting that the resistance between the filler wire 140 and the substrate 110 has exceeded a threshold, or that some quantity related to the resistance between the filler wire 140 and the substrate 110 (e.g., the rate of change of resistance between the filler wire 140 and the substrate 110) has exceeded a threshold. The imminent loss of continuity may then operate as a trigger for a change in the relative motion of the filler wire 140 and the weld pool 130. As such, the criterion for determining when to change the direction of motion of the filler wire relative to the weld pool need not be a complete loss of continuity (i.e., a transition from a near-perfect short circuit to a near-perfect open circuit) and it may instead be a different criterion, such as the resistance between the filler wire 140 and the substrate 110 exceeding a threshold, or the rate of change of the resistance between the filler wire 140 and the substrate 110 exceeding a threshold. Such a criterion, on the resistance between the filler wire 140 and the substrate 110, or on a quantity related to the resistance between the filler wire 140 and the substrate 110 (e.g., the rate of change of resistance between the filler wire 140 and the substrate 110) may be referred to as an "electrical continuity criterion, for electrical continuity between the filler wire and the substrate", or (the weld pool generally being in good electrical contact with the weld pool) as an "electrical continuity criterion, for electrical continuity between the filler wire and the weld pool".

In some embodiments a stuck wire detection circuit may be used as the continuity monitoring circuit 340. A stuck wire detection circuit may be incorporated in the laser welder to detect situations when the filler wire is stuck to the weld at the end of a weld (so that, in such a situation, substrate motion, which may damage the equipment when the wire is stuck, may be avoided). In this case, an existing welder may be modified to implement an embodiment of the present invention by programming it with a suitable algorithm, and without augmenting or otherwise modifying the hardware of the welder.

In some embodiments, the automatic control algorithm may be disabled (i.e., the filler wire height may be held constant, or manually controlled) at the beginning of the weld (until a stable weld pool is established) and at the end of the weld (once the reduction of laser power, at the end of the weld, begins).

Some embodiments may be used in an analogous manner with heat sources other than lasers, e.g., with an arc heat source (as in a tungsten inert gas (TIG) (or GTAW) welder), or with a plasma heat source, and the head of any such heat source may more generally be referred to as a "heating head" instead of the "laser head" mentioned in some examples described herein. Embodiments of the present invention may be used to perform straight, horizontal welds, or other welds, e.g., sloping welds in which the weld head 150 maintains a vertical speed that is a significant fraction of the horizontal feed rate of the substrate, or welds that include changes in direction. In such cases the motion of the weld head 150 may be controlled by a combination of a preprogrammed trajectory that follows the expected weld path, and corrections, provided by an embodiment of the present invention, to account for deviations from the expected weld path.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for filler wire position control have been specifically described and illustrated herein, many modifications and variations will be apparent to those skilled in the art. Accordingly, it is to be understood that a system and method for filler wire position control constructed according to principles of this invention may be embodied other than as specifically described herein. The invention is also defined in the following claims, and equivalents thereof.

What is claimed is:

1. A method for adjusting the position of a filler wire relative to a weld pool during welding, the method comprising:
    determining, by a system for welding, whether an electrical continuity criterion, for electrical continuity between the filler wire and the weld pool, is met;
    moving, by the system for welding, a distal end of the filler wire in a first direction relative to the weld pool, while the electrical continuity criterion is met, the first direction being selected to cause the electrical continuity criterion to cease to be met; and
    when the electrical continuity criterion ceases to be met, moving the distal end of the filler wire in a second direction relative to the weld pool, the second direction being selected to cause the electrical continuity criterion to be met,
    wherein the electrical continuity criterion is met when the resistance between the filler wire and the weld pool is less than a threshold,
    the method further comprising:
    moving a substrate, comprising the weld pool, or moving a heating head, so that the relative motion between the substrate and the heating head is in a third direction; and
    supplying heat from the heating head to the substrate and to the weld pool,
    wherein the first direction is:
        within 30 degrees of a line between the weld pool and the heating head; and
        at least 30 degrees from the third direction.

2. The method of claim 1, wherein:
    the heating head is vertically above the weld pool,
    the first direction is vertically up,
    the second direction is vertically down, and
    the third direction is horizontal.

3. The method of claim 1, wherein the moving of the distal end of the filler wire in the first direction relative to the weld pool comprises moving the distal end of the filler wire relative to the weld pool at a speed that is:
    greater than one hundredth of the speed of the moving of the substrate in the third direction relative to the heating head, and
    less than one half of the speed of the moving of the substrate in the third direction relative to the heating head.

4. The method of claim 1, wherein the moving of the distal end of the filler wire in the second direction relative to the weld pool comprises moving the distal end of the filler wire through a fixed distance relative to the weld pool.

5. The method of claim 4, wherein the filler wire is a round wire having a diameter, and wherein the fixed distance is greater than 0.5 times the diameter and less than 1.5 times the diameter.

6. The method of claim 4, wherein the moving of the distal end of the filler wire through the fixed distance relative to the weld pool comprises moving the distal end of the filler wire through the fixed distance during a time interval shorter than 0.5 seconds.

7. The method of claim 1, wherein the threshold is greater than 100 ohms.

8. The method of claim 1, wherein the determining of whether the electrical continuity criterion is met comprises:
    connecting a direct current source across the filler wire and the weld pool, and
    determining the voltage drop across the filler wire and the weld pool.

9. The method of claim 8, wherein the direct current source comprises a voltage source connected in series with a resistor, and wherein the determining of the voltage drop across the filler wire and the weld pool comprises measuring the voltage drop across the resistor, and subtracting the measured voltage drop from a nominal output voltage of the voltage source.

10. The method of claim 1, wherein:
    the weld pool is in a substrate;
    the method further comprises supplying heat from a heating head to the substrate and to the weld pool, and
    the moving of the distal end of the filler wire in the first direction relative to the weld pool comprises:
        moving the heating head in the first direction relative to the weld pool; and
        maintaining the position of the heating head relative to the distal end of the filler wire constant.

11. The method of claim 10, wherein the heating head is a laser head.

12. The method of claim 1, further comprising maintaining the position of the distal end of the filler wire relative to the weld pool constant, before the moving of the distal end of the filler wire in the first direction relative to the weld pool, and before the moving of the distal end of the filler wire in the second direction relative to the weld pool.

13. The method of claim 1, performed using a system for welding, the system for welding comprising:
    a heating head for heating a substrate;
    a conductive substrate attachment for forming a conductive connection to the substrate;
    the filler wire;
    a continuity testing circuit, configured to perform the determining of whether an electrical continuity criterion, for electrical continuity between the filler wire and the substrate, is met; and
    a filler wire relative position control system,
    the filler wire relative position control system being configured, in operation, to
        perform the moving of the distal end of the filler wire in the first direction relative to the weld pool on the substrate, while the electrical continuity criterion is met; and when the electrical continuity criterion ceases to be met, to perform the moving of the distal end of the filler wire in the second direction relative to the weld pool.

14. The method of claim 13, wherein:
the filler wire relative position control system is further configured to move the substrate in a third direction relative to the heating head; and
the moving of the distal end of the filler wire in the first direction relative to the weld pool comprises moving the distal end of the filler wire relative to a weld pool at a speed that is:
  greater than one hundredth of the speed of the moving of the substrate in the third direction relative to the heating head, and
  less than one tenth of the speed of the moving of the substrate in the third direction relative to the heating head.

15. The method of claim 13, wherein the moving of the distal end of the filler wire in the second direction relative to the weld pool comprises moving the distal end of the filler wire through a fixed distance relative to the weld pool.

16. The method of claim 13, wherein the system for welding further comprises a conductive sleeve surrounding the filler wire and connected to the continuity testing circuit.

17. The method of claim 1, wherein the moving of the distal end of the filler wire in the first direction relative to the weld pool comprises moving a filler wire feed unit in the first direction relative to the weld pool, the filler wire feed unit being configured to feed the filler wire.

\* \* \* \* \*